Nov. 23, 1954
J. D. VANDAL
2,694,946
PORTABLE DUAL CONTROL MECHANISM
Filed July 11, 1951
2 Sheets-Sheet 1
FIG.1
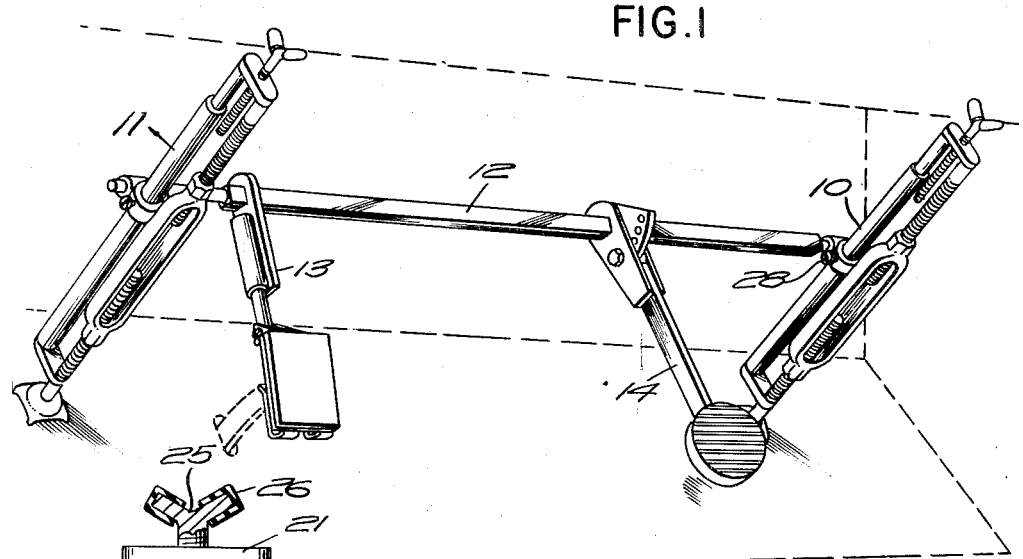
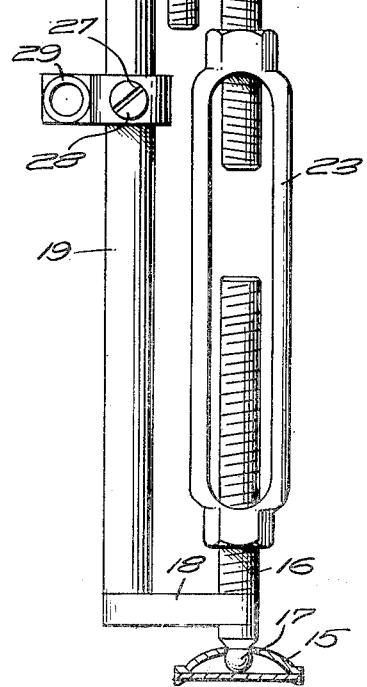
FIG.2
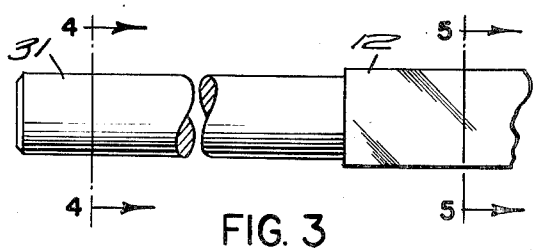
FIG. 3
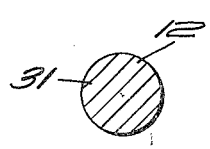
FIG.4
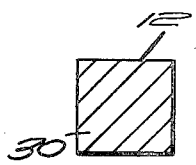
FIG.5
*INVENTOR.*
JOSEPHAT D. VANDAL
BY
ATTORNEY Nov. 23, 1954   J. D. VANDAL   2,694,946
PORTABLE DUAL CONTROL MECHANISM
Filed July 11, 1951   2 Sheets-Sheet 2
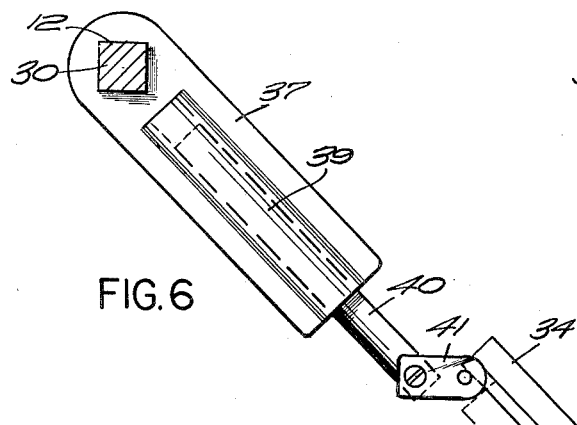
FIG. 6
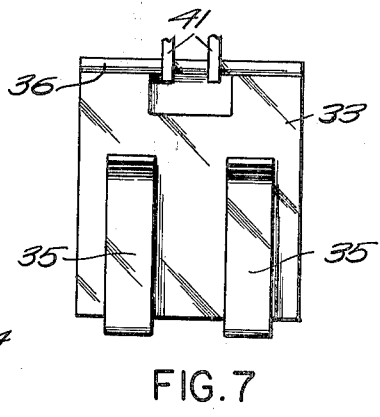
FIG. 7
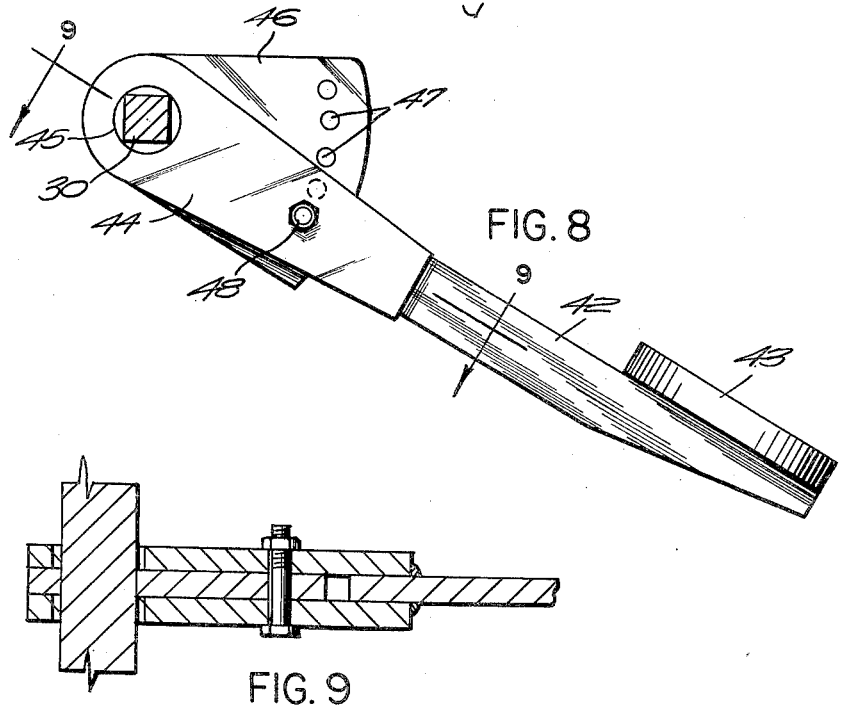
FIG. 8
FIG. 9
*INVENTOR.*
JOSEPHAT D. VANDAL
BY
ATTORNEY ּ
United States Patent Office 2,694,946
Patented Nov. 23, 1954

2,694,946
PORTABLE DUAL CONTROL MECHANISM

Josephat D. Vandal, Fall River, Mass.

Application July 11, 1951, Serial No. 236,174

1 Claim. (Cl. 74—562.5)

My present invention relates to dual control mechanisms for automotive vehicles, and more particularly to a portable dual control mechanism.

The principal object of the present invention is to provide a dual control mechanism which can be attached to any automotive vehicle, but which is not permanently attached and can be readily removed.

A further object of the present invention is to provide a portable dual control mechanism which can quickly and easily be installed in any make of automobile.

Another object of the present invention is to provide a portable dual control mechanism which is adjustable to fit any design or construction of motor vehicle.

A further object of the present invention is to provide a portable dual control mechanism which is simple in construction and easy to install.

With the above and other objects and advantageous features in view, my invention consists of a novel arrangement of parts, more fully disclosed in the detailed description following, in conjunction with the accompanying drawings, and more particularly defined in the appended claim.

In the drawings—

Fig. 1 is a perspective view of a dual control mechanism embodying my invention.

Fig. 2 is a side elevation of one of the adjustable supports.

Fig. 3 is an enlarged view of one end of the supporting bar.

Fig. 4 is a section taken on line 4—4 on Fig. 3.

Fig. 5 is a section taken on line 5—5 on Fig. 3.

Fig. 6 is a side elevation of the pedal attachment and operating means.

Fig. 7 is a bottom plan view of the pedal attaching member.

Fig. 8 is a side elevation of the auxiliary pedal.

Fig. 9 is a section taken on line 9—9 on Fig. 8.

It has been customary to provide automotive vehicles with dual control mechanisms for teaching people how to operate a vehicle. These dual control mechanisms provide the instructor with an auxiliary brake pedal, or, if desired, with both the brake and clutch pedal. However, it is essential that the instructor have at least an auxiliary brake pedal, so that he can stop the car in an emergency. Heretofore such devices have been permanently attached to the instructor's vehicle, making it necessary for the student to use that vehicle in order to teach her to drive. The resultant heavy wear on the instructor's vehicle has made it costly to operate such a vehicle.

The present invention is designed to provide a portable dual or auxiliary control mechanism which can be quickly installed in any vehicle and readily removed therefrom. This will permit the instructor to install the dual control device in the student's own car and remove the same after the lessons have been completed. The device of the present invention must also be made adjustable so that it will fit all the various models and makes of cars.

Referring more in detail to the drawings illustrating my invention, the dual control device shown assembled in Fig. 1 comprises a pair of spaced adjustable vertical supports 10 and 11. Extending horizontally between the supports 10 and 11 is a shaft 12. An auxiliary pedal operating device 13 extends from the shaft to the brake pedal of the vehicle. At the point where the instructor is seated, an auxiliary brake pedal 14 is attached to the shaft 12. The device is so constructed that when the instructor presses the auxiliary brake pedal 14, the operating shaft 12 will cause the device 13 to also depress the vehicle's brake pedal, causing the car to stop.

The vertical supporting posts 10 and 11 are designed to support the operating mechanisms hereinabove referred to between the floor board of the vehicle shown in dotted lines in Fig. 1 and the lower edge of the dashboard of vehicle, also shown in dotted lines in Fig. 1. Since the angle of the vehicle floor board and the height of the lower edge of the dashboard therefrom varies with different models of vehicles, it is necessary that the vertical supporting posts 10 and 11 be made adjustable to accommodate the varying distances. In addition, the position of the steering post and its distance from the dashboard may also vary in different vehicles and provision must be made for changing the spacing of the posts 10 and 11. This is accomplished by providing for the adjustable post construction shown in Fig. 2 and for the operating shaft construction shown in Figs. 3 and 4.

Referring to Fig. 2, each post 10 and 11 comprises a rectangular support 15 supporting the vertical bar 16. The lower end of the bar 16 is provided with an integral annular portion 17 extending into an opening in the support 15 to provide a universal joint. This permits the support 15 to assume the proper angle to compensate for the angle of the floor board. Adjacent the lower end of the bar 16 is a horizontal supporting plate or bar 18 supporting on the outer end thereof a vertical tube or sleeve 19. Slidable within the sleeve 19 is a bar 20 having at its upper end a horizontal supporting bar or plate 21. The outer end of the bar 21 is fixed to a vertical downwardly extending bar 22 in alignment with the upwardly extending bar 16. The bars 16 and 22 are provided with opposite threads and a turn buckle 23 is threaded thereon so that movement of the turn buckle 23 in one direction will cause a raising of the bar 22, and movement of the turn buckle in the opposite direction will cause a lowering of the bar 22. This raising and lowering of the bar 22 will cause the plate 21 to raise and lower with it and the bar 20 will move telescopically within the sleeve 19. In the center of the plate 21, the supporting bar 24 extends threadedly therethrough, the upper end of the bar 24 forming a wide V-shaped support 25. The arms of the V-shaped support 25 may be rubber covered as at 26 to avoid scratching the vehicle.

It can thus be readily seen that in installing the supports 10 and 11 in a motor vehicle, the turn buckle 23 can be turned to lower the plate 21 and bar 24 so that the distance between the bottom and the top of the support is less than the distance between the floor board and the lower edge of the dashboard. With the support in position, the turn buckle can then be turned in the opposite direction to extend the support until the V-shaped portion 25 grips the lower edge of the dashboard and the device is locked into the position shown in Fig. 1. The turn buckle construction and the threaded bar 24 permit a considerable extension of the device to accommodate different makes and models of vehicles. For example, the device can be extended from a minimum of fourteen inches, which is required on certain vehicle models, to as much as thirty inches, which is also required on some vehicle models.

The supports 10 and 11 are designed to support the operating shaft 12. However, again depending on the type of vehicle, the distance of the operating shaft from the floor board must also be adjusted. Therefore, I provide a sleeve 27 vertically slidable on the sleeve portion 19, as shown in Figs. 1 and 2, and provided with a set screw 28 for locking it in any desired vertical position. Each sleeve 27 is provided at the rear portion thereof with a bearing 29. The operating shaft 12 has a rectangular cross section 30 in the main body thereof, but is provided with integral annular cross sectional portions 31 at each end thereof. The annular portions 31 extend into the bearings 29 on the sleeves 27. In order to make an adjustment of the spacing between the vertical supporting posts 10 and 11, one of the annular portions 31 on the operating shaft 12 is much longer than the other one, so that the position of the posts can be changed and still permit proper support for the operating shaft.

Referring to Figs. 6 and 7, the device is attached to the brake pedal 32 by means of the pedal operating device shown in Fig. 6 and the auxiliary pedal member shown in Fig. 7. The pedal member shown in Fig. 7 comprises the rectangular plate 33, which is provided with a rubber face 34, similar to the main brake pedal. The plate 33 is provided with a pair of spring strip portions 35 reentrantly bent to clamp under the pedal 32, as shown in Fig. 6. The rear edge of the plate 33 is provided with a pivot rod 36. Now, referring to Fig. 6, I provide a bar or plate 37 having a rectangular opening adjacent one end adapted to fit over the rectangular portions 30 of the shaft 12. In this position, turning movement of the shaft 12 will cause corresponding turning movement of the plate 37. Welded or otherwise attached to one side of the plate 37 is a tubular sleeve 39. A bar 40 is slidable within the sleeve 39 and is pivotally linked with a pair of pivot links 41 to the pivot bar 36 in the plate 33. This construction is required because the main brake pedal 32 travels in an arcuate line when depressed. The plate 37 will swing in a different arc when the shaft 12 is turned. The two arcs diverge and the result will be a widening of the distance between the plate 37 and the brake pedal 32. To make up for this widening of the distance, the pivot plates 41 will cause the bar 40 to slide within the sleeve 39. The parts will thus remain in operative engagement, even though the distance between them will vary.

It can be seen from the applicant's construction that turning movement of the operating bar 12 will depress the brake pedal 32. This turning movement is provided at the auxiliary brake pedal 14 shown in detail in Figs. 8 and 9. It is necessary, again to compensate for the varying designs of motor vehicles, that the height of the auxiliary brake pedal 14 be adjustable. Referring to Figs. 8 and 9, I provide a pedal bar 42 having at its free end a rubber pedal portion 43 for applying the pressure. At the inner end of the pedal bar 42 are a pair of spaced parallel extending bar portions 44 provided with an annular opening 45 adapted to surround the rectangular portion 30 of the shaft 12. The portions 44 form a fork which surround a generally triangular adjusting plate 46 having a rectangular opening surrounding the rectangular portion of the shaft 30. Adjacent the outer end of the plate 46 are a plurality of spaced openings 47, as shown in Fig. 8. The plate 46 is in fixed relation with respect to the shaft 12 and will turn with it. The portions 44, having annular openings 45, will not rotate with the shaft. The pedal bar 42 can, therefore, be moved upwardly or downwardly in an arc and when the proper height is reached, a bolt 48 is put through the portions 44 and through the adjacent adjusting opening 47 in the plate 46. This will lock the auxiliary pedal to its proper height in relation to the plate 46. Now, movement of the bar 42 will cause movement of the shaft 12 through the plate 46.

With the parts positioned as above described, it is evident that the mechanism can readily be assembled in any model or design of vehicle into the position shown in Fig. 1. The instructor can stop the car by depressing the auxiliary brake pedal 14. The turning movement will cause a rotation of the operating bar 12 and in turn, turning movement of the assembly 13, which will depress the main brake pedal 32. This construction is especially adaptable to the newer types of vehicles having automatic transmissions in which no clutch pedal is provided. However, even where the vehicle is equipped with a clutch, it is well known that a better braking action is provided if the clutch pedal is not depressed simultaneously with the brake. The car can be quickly stopped and the only harm that may result is that the engine will stall. If a more elaborate construction is desired, a second operating bar can be positioned on the supports or on separate supports for operating a clutch pedal independently of the brake pedal.

The above construction, therefore, provides a simple and readily installed device for providing a dual brake control on any automotive vehicle. The device is so constructed that it can be firmly and rapidly installed in any make or model of vehicle regardless of shape or interior construction, without impairing or permanently bolting or screwing to the vehicle. After its function has been accomplished, the device can be removed in a minimum of time. Other advantages of the present invention will be readily apparent to a person skilled in the art.

I claim:

A dual control mechanism comprising a pair of spaced vertical supports adapted to be mounted beneath the dash board of a motor vehicle, a horizontal shaft extending between said supports, adjustable means on said shaft for depressing an automobile control pedal, said means comprising a member fixed to said shaft and having an axial opening, a plate fixed to said pedal, a link pivotally mounted to said plate and pivotally mounted to a bar slidable in said opening, and adjustable means on said shaft for rotating said shaft to actuate said first named means, said supports comprising an extendable turnbuckle having means for engaging the floor of the car at one end and the edge of the dash board at the other end, and said adjustable rotating means being adjustable axially to and at right angles to said shaft.

References Cited in the file of this patent

UNITED STATES PATENTS

| Number | Name | Date |
|---|---|---|
| 461,452 | Scrugham | Oct. 20, 1891 |
| 688,416 | Hopphan | Dec. 10, 1901 |
| 835,835 | Schumacher | Nov. 13, 1906 |
| 1,157,140 | Anderson | Oct. 19, 1915 |
| 1,516,862 | Loury | Nov. 25, 1924 |
| 1,889,685 | McIntyre | Nov. 29, 1932 |
| 1,970,160 | Allison | Aug. 14, 1934 |
| 2,163,571 | Brock | June 27, 1939 |
| 2,166,978 | Stack | July 25, 1939 |
| 2,219,169 | Alter | Oct. 22, 1940 |
| 2,436,799 | Frost | Mar. 2, 1948 |
| 2,489,727 | Shipley | Nov. 29, 1949 |
| 2,590,320 | Houser | Mar. 25, 1952 |
| 2,599,656 | Ostrow | June 10, 1952 |
| 2,647,414 | Nafe, et al. | Aug. 4, 1953 |

FOREIGN PATENTS

| Number | Country | Date |
|---|---|---|
| 473,237 | Canada | May 1, 1950 |

OTHER REFERENCES

"Instructions for Installing 1949 Pontiac Dual Controls," published by AAA Traffic Eng. and Safety Dept. (Washington, D. C.), September 8, 1950.